United States Patent [19]
Johnshoy

[11] Patent Number: 4,762,022
[45] Date of Patent: Aug. 9, 1988

[54] TORQUE RETAINING AND PROPORTIONING DIFFERENTIAL DRIVE ASSEMBLY

[76] Inventor: Edward W. Johnshoy, R.R. 1, Box 258A, Mentor, Minn. 56736

[21] Appl. No.: 40,541

[22] Filed: Apr. 17, 1987

Related U.S. Application Data

[63] Continuation-in-part of Ser. No. 881,827, Jul. 3, 1986.

[51] Int. Cl.$^4$ .................... F16H 1/44; F16H 37/06
[52] U.S. Cl. ............................ 74/711; 74/714; 74/715; 74/674; 180/6.28
[58] Field of Search ............. 74/674, 682, 711, 713, 74/714

[56] References Cited

U.S. PATENT DOCUMENTS

| | | | |
|---|---|---|---|
| 1,849,285 | 3/1932 | Dickey | 74/713 X |
| 2,209,367 | 7/1940 | Watson | 74/259 |
| 2,342,755 | 2/1944 | Randal | 74/313 |
| 2,666,343 | 1/1954 | Casa-Masa | 74/715 |
| 2,761,332 | 9/1956 | Gray et al. | 74/714 X |
| 2,780,299 | 2/1957 | Matson | 180/6.28 |
| 2,859,641 | 11/1958 | Gleasman | 74/715 |
| 2,898,779 | 8/1959 | Mickelson | 74/711 |
| 3,220,284 | 11/1965 | Horvath | 74/674 |
| 3,651,712 | 3/1972 | Davis | 74/687 |

FOREIGN PATENT DOCUMENTS

| | | | |
|---|---|---|---|
| 966914 | 10/1950 | France | 74/711 |
| 2553721 | 4/1985 | France | 74/711 |
| 17424 | of 1910 | United Kingdom | 74/711 |
| 992220 | 5/1965 | United Kingdom | 74/711 |
| 1316121 | 5/1973 | United Kingdom | 74/711 |

OTHER PUBLICATIONS

Mike Bargo, "The Strange Geometry of Gleason's Impossible Differential", *Popular Science*, pp. 58–61, Feb. 1984.

Primary Examiner—Dirk Wright
Attorney, Agent, or Firm—Kinney & Lange

[57] ABSTRACT

A differential drive assembly incorporates the use of two separate and essentially parallel output drive shafts, each receiving torque through separate differential gear clusters from separate spur drive gears, which receive input power, from a transmission. Each spur drive gear is attached to an input gear of a differential gear cluster and both gears are rotatably mounted on the output shaft for that gear cluster. The differential gear clusters drive the output shafts. A control gear of each differential gear cluster, which controls the output ratio of the connected gear cluster is attached to a worm and each control gear and attached worm are also rotatably mounted on the respective output shaft. The rotation of the control gears and worms is controlled by a worm gear situated between and engaged with both worms and rotatably mounted in the gear case on an axis perpendicular to the plane of the axes of the worms. The worm gear thus engaged with both worms allows rotation of the worms only when both worms rotate, and in opposite directions. The engagement of the worms with the worm gear as used in the differential drive assembly therefore provides: (1) control of the control gear of each differential gear cluster allowing transmission of torque to the axles; (2) control of balanced proportionate differentiated drive, by allowing the worms to rotate in opposite directions; (3) control of the dissipation of torque especially, using the irreversible drive feature of worm-worm gear engagement. Available torque is therefore retained, continuously proportioned, and utilized, that is, torque is never dissipated but directed to and used by the wheel or wheels (in 4-wheel drive) which can use it most effectively.

19 Claims, 9 Drawing Sheets

TORQUE RETAINING AND PROPORTIONING DIFFERENTIAL DRIVE ASSEMBLY

CROSS REFERENCE TO RELATED APPLICATIONS

This application is a continuation-in-part of my co-pending application Ser. No. 881,827, filed July 3, 1986, for "Torque Retaining and Proportioning Differential Drive Assembly".

BACKGROUND OF THE INVENTION

1. Field of the Invention

The present invention relates to torque proportioning differential drives.

2. Description of the Prior Art

In 1958, U.S. Pat. No. 2,859,641, issued to V. E. Gleasman on a Differential Gear Mechanism, and disclosed a differential utilizing worms and worm gears arranged around a central hub and driven from a ring gear. This differential concept was refined in various ways by Gleasman, and in the February 1984 issued of Popular Science, pages 58 through 61, an article entitled "The Strange Geometry of Gleason's Impossible Differential", was published explaining the principles advanced by Gleasman. The discussion in Popular Science points up the differences between the differential using the principles set forth in the Gleasman patent, and the conventional bevel gear differential. The terminology in the Popular Science article uses the term "worm gear" for the "worm" and the term "worm wheel" for the worm gear, so the terminology used herein is slightly different.

However, Gleasman uses "worm gears" as axle side gears and three paris of "worm wheels" with integral spur balancing gears which function to prevent rotation of worm wheels during drive, to transmit and balance opposite rotation of worm wheels as they are rotated by axle worms during differentiation, and to transmit the torque thrust from the driven gear carrier via the worm wheel on the good traction side to the worm wheel on the poor traction side which worm wheel cannot rotate the axle worm gear thus proportioning torque to the good traction side. The Gleasman drive is based on the principle that a worm gear (or worm wheel as Gleasman calls it) cannot drive a worm, but the worm can drive the worm gear or worm wheel. Gleasman teaches that lead angles of the worm should be between 27 and 35 degrees, which provide anti reverse features and minimize adverse effects of shear forces.

Another differential mechanism using the principles of worm and worm gear drives is shown in U.S. Pat. No. 2,666,343, issued to Casa-Massa. The arrangement in this patent is different than that shown in the Gleasman patent.

Patents disclosing various forms of this concept have issued to Gleasman in the ensuing years, but none of the differentials utilizing the worm-worm gear irreversible drive feature has the power divided between two power paths comprising, as shown, parallel shafts that are each coupled to a worm mounted onto a separate control bevel gear of separate bevel gear differentiating gear clusters through which the respective outputs shafts are driven.

In the present invention, the worms are coupled together through a single worm gear (which is drivably engaged with both worms) to provide especially the means (irreversible drive feature) for proportioning torque to the good traction side of a vehicle while, at the same time, controlling the rotation of worms and attached control bevel gears which operate through separate bevel gear differentiating gear clusters, allowing the worms and attached control bevel gears to rotate in opposite directions to the extent that rpm differentiation is required, while regulating the rotation of the control bevel gears to allow continuous proportioned driving torque to be transmitted via orbiting spider gears to the separate power shafts, whether or not differentiation is occuring. Proper differentiation is caused to occur even with poor traction on one side of the vehicle, as does Gleasman's differential. With good traction on both sides of the vehicle, the conventional differential will also properly differentiate, that is, in turn one axle will rotate faster, and the other axle rotate slower, by the same number of rpm, than the rpm of the driven gear carrier.

The differentiating gear clusters in the present device are both driven from one input shaft and drive the output shafts from the differential to in turn drive rear axle assemblies.

SUMMARY OF THE INVENTION

The present invention relates to a torque proportioning differential drive utilizing, in its basic form, a single input shaft that drives a pair of differentiating gear clusters that form power dividing paths for driving a pair of output shafts. The gear clusters are either bevel gear or planetary differentiating gear assemblies. In the bevel gear form, the input gears drive orbiting spider gears that will orbit around control bevel gears coaxial with the input gears. The orbiting spider gears are mounted on cross shaft spiders of the output shafts providing continuous drive to the output shafts. The planetary form uses sun gear and planet gears when differential movement is controlled by a control gear having internal gear teeth. Each of the control gear of the two power paths in both forms is drivably coupled to a worm that is in turn rotatably mounted relative to the respective output shaft. The two worms are joined or coupled through a single worm gear rotatably mounted between and on an axis 90° to the plane of the axes of the worms.

The worm gear functions to control the rotation of the worms and the respective control gears, which are stationary in non- differentiating drive, and which are allowed to rotate in opposite directions during differentiated drive, and since a worm gear cannot drive a worm, the worm gear functions to prevent the torque thrust from speeding up the power shaft on the poor traction side during both differentiating and non-differentiating drive.

Because of the latter function and in view of the reactive thrust of driving torque, differentiation is best served by a larger rather than a smaller worm helix angle. As shown, about a 20° worm helix angle with the complementary 70° worm gear helix angle is satisfactory. A 20° helix angle is achieved with quadruple thread worms of 1.833" pitch diameter engaging a worm gear of 2.666 pitch diameter having a diametral pitch of 6 with 16 teeth each. The power shaft centers with such arrangement are 4.5 inches apart.

If five inch spacing for the drive shafts is desired, 2.667 pitch diameter eight thread worms can be used and using a 2.333 pitch diameter worm gear having a six inch diametral pitch and 14 teeth results in a worm helix angle of 26°34' with the worm gear helix angle of 63°14'.

The output shafts as shown are parallel output shafts, and the output ends can be coupled to suitable drive units. In the simplest form the output ends of the drive shafts are coupled to individual rear axle bevel drive gears that will in turn individually drive the rear axles of a vehicle.

The differentiating gear drive arrangement of the present invention can be used for a four wheel drive unit, which includes a center or mid differential, a rear differential and a front differential. The mid differential has divided power output paths, but the two paths are made so that one of the output shafts in the one path drives the rear differential, and the other output shaft in the other power path drives the front differential. The front and rear differentials operate as previously explained. The use of the mid-differential insures that the torque is proportioned between the front and rear axle units, so that in situations where traction is different at the front and the rear the torque will still be proportioned between the front and rear differentials, and each of the differentials in turn will still proportion the torque between the left and right wheels so that a wheel having good traction will be capable of driving the vehicle.

The differential assemblies can be made compact, and use standard gear components, bearings, and the like. A relatively low cost, torque proportioning differential is thus available proportioning torque between two separate output shafts through the use of a worm and worm gear set, with one worm coupled to each of the output shafts through a differentiating gear assembly.

DETAILED DESCRIPTION OF THE PREFERRED EMBODIMENTS

The torque proportioning differential drive shown in a simplified, single axle drive embodiment is illustrated in FIGS. 1–5.

Figure 1:
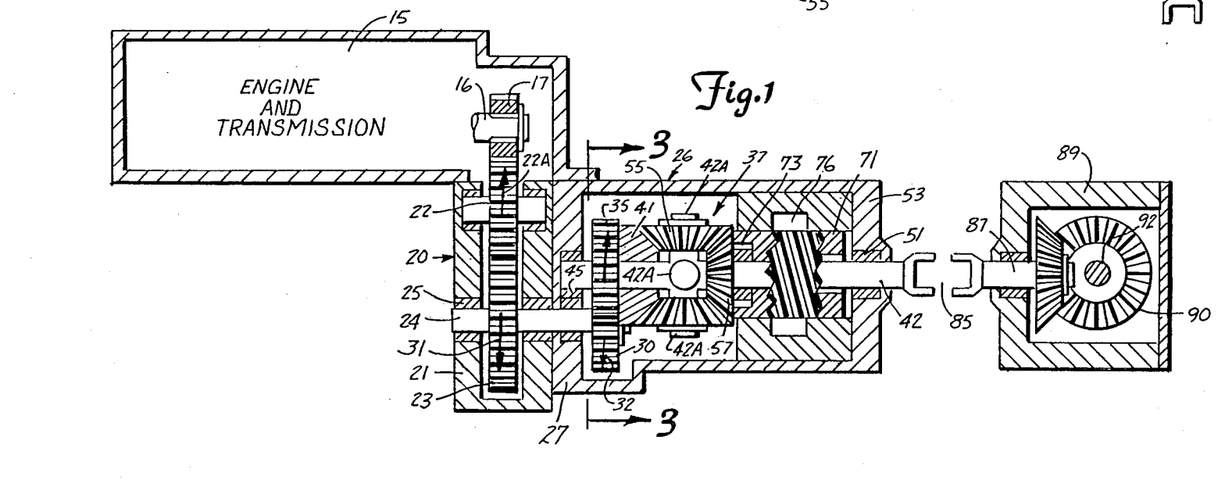
FIG. 1 is a side elevational view of a schematically shown engine and transmission, and showing a rear drive differential arrangement made according to the present invention with parts in section and parts broken away.

The torque proportioning drive as will be shown uses parallel, independent output shafts which drive the rear or front wheels independently, so that there are parallel power paths where the power is divided for the final drive. In an embodiment used in connection with four wheel drive vehicles the torque proportioning differential is used in a mid-differential drive for driving forward and rear differentials that then drive the axles to the drive wheels. As shown in FIG. 1, an engine and transmission indicated schematically at 15 has a transmission output shaft 16 that is a normal drive ouptut shaft from a transmission having suitable gear ratios. The engine and transmission can be conventional, either manual shift or automatic, and the output shaft 16 has a spur gear 17 drivably mounted thereon, which in turn will drive the output drive components. In the embodiment shown in FIG. 1, it is to be understood that the intermediate gear assemblies can be modified to obtain the desired gear ratios, and may not even be used if desired so that a direct drive to the differential components can be made from the transmission output shaft. Intermediate gear cases may be used, if desired, as well.

However, as shown, a spur gear drive, which can have interchangeable size gears, is shown generally at 20 and it is fixed to the transmission housing. The gear drive 20 has an outer housing 21 that mounts a first idler gear 22 that meshes with gear 17 and rotates on its outer periphery as shown in FIG. 1 in direction of the arrow 22A. This gear is suitably mounted on a shaft that rotates in bearings in the housing 20 in a conventional manner.

Gear 22 in turn drives a spur gear 23 that is drivably mounted onto a drive shaft 24. The drive shaft 24 is mounted on suitable bearings 25 in the gear case 21, and also passes through the rear wall of this gear case 21 and through a forward wall 27 of a differential drive gear case indicated generally at 26. The forward wall 27 of the gear case 26 has suitable bearings for mounting the shaft 24, and as stated the gear 23 drives the shaft 24 which in turn is driven through a spline or suitable member to drive a spur gear 30 (see also FIG. 3) that is mounted inside the differential housing 26. The spur gear 30 as shown in this form of the invention is at the lower side of the differential housing 26. Gear 23 is rotated in direction that is indicated by the arrow 31 (FIG. 1), and gear 30 thus also rotates in this same direction as indicated by the arrow 32. Arrow 32 is also shown in FIG. 3.

Figure 2:
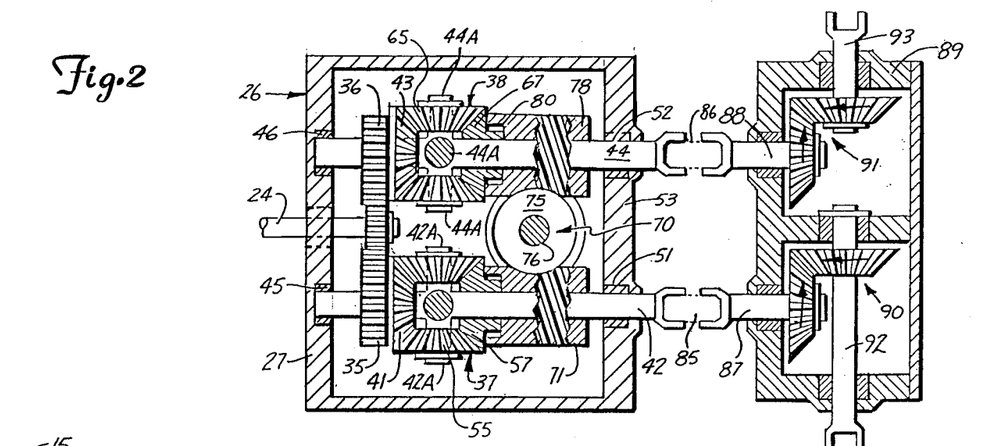
FIG. 2 is a top part sectional view of the differential and rear drive of FIG. 1.
Figure 3:
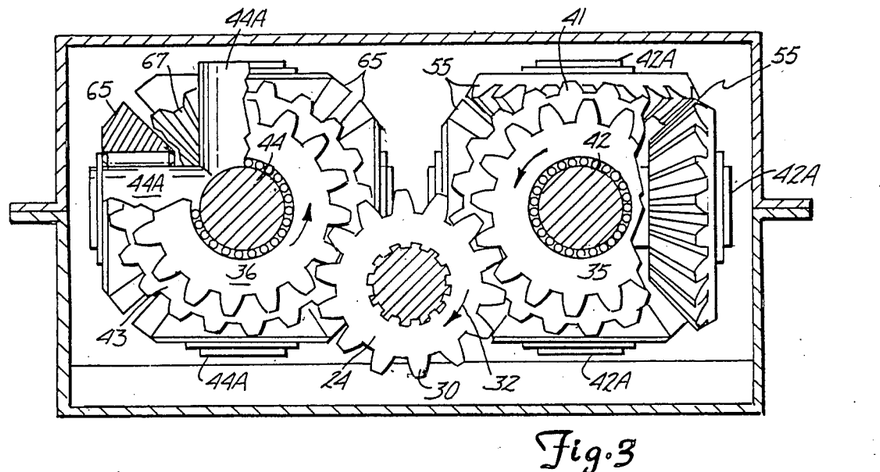
FIG. 3 is a sectional view taken along line 3—3 in FIG. 1.

The gear 30 as shown in FIG. 3 drives a pair of power dividing spur gears 35 and 36, respectively. The spur gears 35 and 36 comprise power input gears to a pair of differential bevel gear drive clusters indicated generally at 37 and 38 (FIG. 2), respectively. These drive clusters 37 and 38 are identically constructed, as are the differential drive gear clusters in other forms of the invention, but in this form of the invention the gears will be separately numbered, even though they operate in precisely the same manner for the output drive.

The first input drive spur gear 35 is splined onto, or otherwise drivably attached to a first bevel gear 41 forming a portion of the differential drive cluster 37. The bevel gear 41 and its spur gear 35 are rotatably mounted onto a first output shaft 42 which is of a pair of parallel drive shafts. The shaft 42 comprises one of the parallel power paths that is used with the torque proportioning differential drive.

The gear 36 in turn is splined or otherwise drivably attached to a bevel gear 43 (FIG. 2). The spur gear 36 and bevel gear 43 are both rotatably mounted onto a second of the parallel drive shafts indicated at 44. The output drive shafts 42 and 44 are identically constructed as well.

The rotatable mounting of the spur gear and bevel gear set 35 and 41 for the cluster 37 on shaft 42 and the spur and bevel gear set 36 and 43 for the cluster 38 on shaft 44 shows there is no drive directly from these gears to the parallel output shafts 42 and 44.

The shafts 42 and 44 have first end portions rotatably mounted on suitable bearings 45 and 46 in the front wall 27 of the differential housing or case 26. The bearings 45 and 46 preferably are tapered roller bearings that take both end thrust and radial loads, although the bearings are shown only schematically. The shafts 42 and 44 have output end portions rotatably mounted in suitable bearings 51 an 52, respectively at the rear wall 53 of the differential case. These bearings also can be taper roller or similar bearings that carry both thrust and radial load.

The shafts 42 and 44 each include spiders of four radial shafts or cross shafts fixed to shafts 42 and 44 to rotatably support spider bevel gears, as perhaps best seen in FIG. 2. The radial shafts or cross shafts on shaft 42 are shown at 42A and each are 90° from adjacent shafts. The parallel output shaft 44 has radial shafts or cross shafts 44A thereon.

Figure 4:
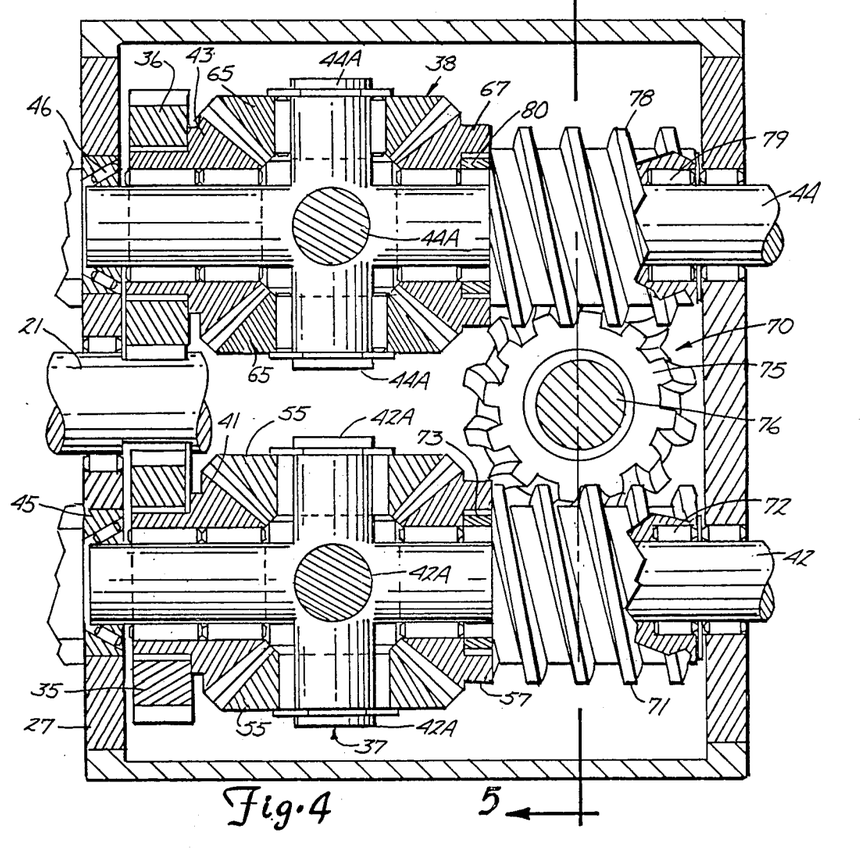
FIG. 4 is an enlarged view of the differential portion of FIG. 2 with parts in section and parts broken away.

FIGS. 3 and 4 show the details of the gear clusters 37 and 38, and the positioning of the radial or cross shafts holding the differential drive orbiting spider bevel gears.

In the gear cluster 37, four orbit spider bevel gears 55 are mounted onto the respective cross shafts 42A on suitable bearings, so that the bevel gears are freely rotatable on the cross shafts 42A. These bevel gears 55 are held in place with suitable snap rings on the cross shafts, and engage the bevel gear 41. Further, the gear cluster 37 includes a control bevel gear 47 rotatably mounted on the shaft 42 on an opposite side of the cross shafts from gear 41 and engaging the bevel gears 55. This control bevel gear 57 is controlled to be nonrotatable except when differential speeds are required. Thus, normally as the bevel gear 41 is rotated, the gears 55 are driven to orbit around the gear 57 and thus drive the shaft 42 through the radial shafts or cross shafts 42A. The shaft 42 is thus rotated at a different speed from the input bevel gear 41 determined by the rotation of the control bevel gear 57. The gear cluster 37 provides a gear ratio of 2:1, that is the output shaft 42 rotates at one half of the rotational speed of the gear 41 where gear 57 is held.

It can therefore be seen that by controlling the gear 57 so that it is held or rotates at a controlled rate, and in a selected direction relative to the direction of rotation of gear 41 the output speed of the shaft 42 can be likewise controlled and changed.

The gear cluster 38 operates in the same way as explained for the gear cluster 37, and includes orbiting spider bevel gears 65 mounted onto the cross shafts 44A, and a control bevel gear 67 that is rotatably mounted on the output portion of the shaft 44. The control bevel gear 67 is normally held from rotation until differential output speeds of shafts 42 and 44 are required. The gear 67 is controlled in the same way as gear 57.

The control bevel gears 57 and 67 are controlled through the use of a worm and worm gear assembly indicated generally at 70 that provides proportioning of torque between the parallel power paths including the shafts 42 and 44 and as controlled by the differentiating gear clusters 37 and 38.

Figure 5:
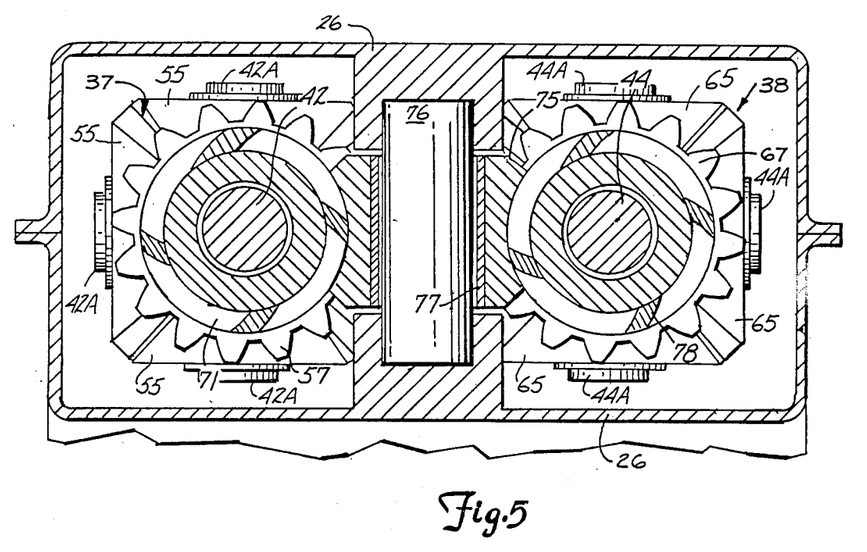
FIG. 5 is a sectional view taken on line 5—5 in FIG. 4.

Reference is made specifically to FIGS. 4 and 5, wherein the worm gear assembly 70 includes a worm (a spiral gear) 71 that is rotatably mounted on suitable bearings 72 on the shaft 42, and which in turn is splined as at 73 to the hub of the control gear 57. Thus, worm 71 becomes a member that is drivably coupled to the control gear 57 and controls rotation of the gear 57. The worm 71 engages a worm gear 75 which is rotatably mounted on a shaft 76 that is suitably supported in the differential housing 26, as shown in FIG. 5. The worm gear 75 is mounted on a suitable bushing 77, and the axis of the shaft 76 is perpendicular to the axes of the shafts 42 and 44.

A second worm 78 is rotatably mounted on the shaft 44 on suitable bearings 79, and is splined as at 80 to the hub of the control gear 67 for the second gear cluster 38. The worm 78 also engages the worm gear 75, on a diametrically opposite side of the worm gear from worm 71.

The torque proportioning feature involves the worm gear 75 operating in the gear assembly 70 to engage the two worms 71 and 78. The differential drive operates on the principle that the worm gear cannot drive a worm, but worms can drive a worm gear. Thus it is immediately apparent that the first worm 71 will be prevented from rotation by the worm gear 75 unless the worm 78 is rotating in a opposite direction, and vice versa. That is, the worm 78 will be prevented from rotating unless the worm 71 is rotating in an opposite direction so that the worm gear 75 can rotate on the shaft 76.

The helical angle of the worm can be in the range of 25 degrees, with the angle of the worm gear being the complement of this angle. The selection of the helix angle is well within the skill of the art.

The output power in the two parallel power paths defined by shafts 42 and 44 is transmitted by the shafts 42 and 44 through suitable universal or constant velocity joint assemblies shown at 85 and 86, respectively, to input shafts 87 and 88 of a final rear axle drive housing 89 (as shown in FIGS. 1 and 2). Two separate bevel gear sets 90 and 91 are mounted in the housing 89, to in turn drive the output axles 92 and 93 in a conventional manner.

The axle shafts 92 and 93 are connected to lateral axle shafts that in turn drive the wheels of a vehicle (not shown) in a normal way.

It can be seen that under normal conditions, one of the axle shafts 92 or 93 cannot turn independently of the other, because they come from a common drive and the control gears 57 and 67 are normally held, and only when the worms 71 and 78 are rotating in opposite direction so that the worm gear 75 can rotate, will differential rotational speed of the output shafts be possible.

In FIGS. 6 through 11, the torque proportioning differential drive of the present invention is shown for use in a four wheel drive vehicle 98, and although the showing is schematic and not to scale, the principles of the invention are illustrated. The assembly includes three distinct differentials, each of which has parallel power paths from its input to its output. The four wheel drive assembly indicated generally at 99 includes a mid-differential section 100, a rear differential 200 which corresponds to the differential shown in FIGS. 1 and 2, except that it has worms that are of opposite lead angle, that is, a left hand lead angle, instead of a right hand, and a front differential 300 that is used for driving front wheel drive axles.

The operation of the differentials is precisely the same as that previously explained, operating on the principle that a worm can drive a worm gear, but the worm gear cannot drive the worm, and using parallel power paths from a single input shaft in each differential to drive the two parallel output shafts. The drive is a divided path drive.

Figure 6:
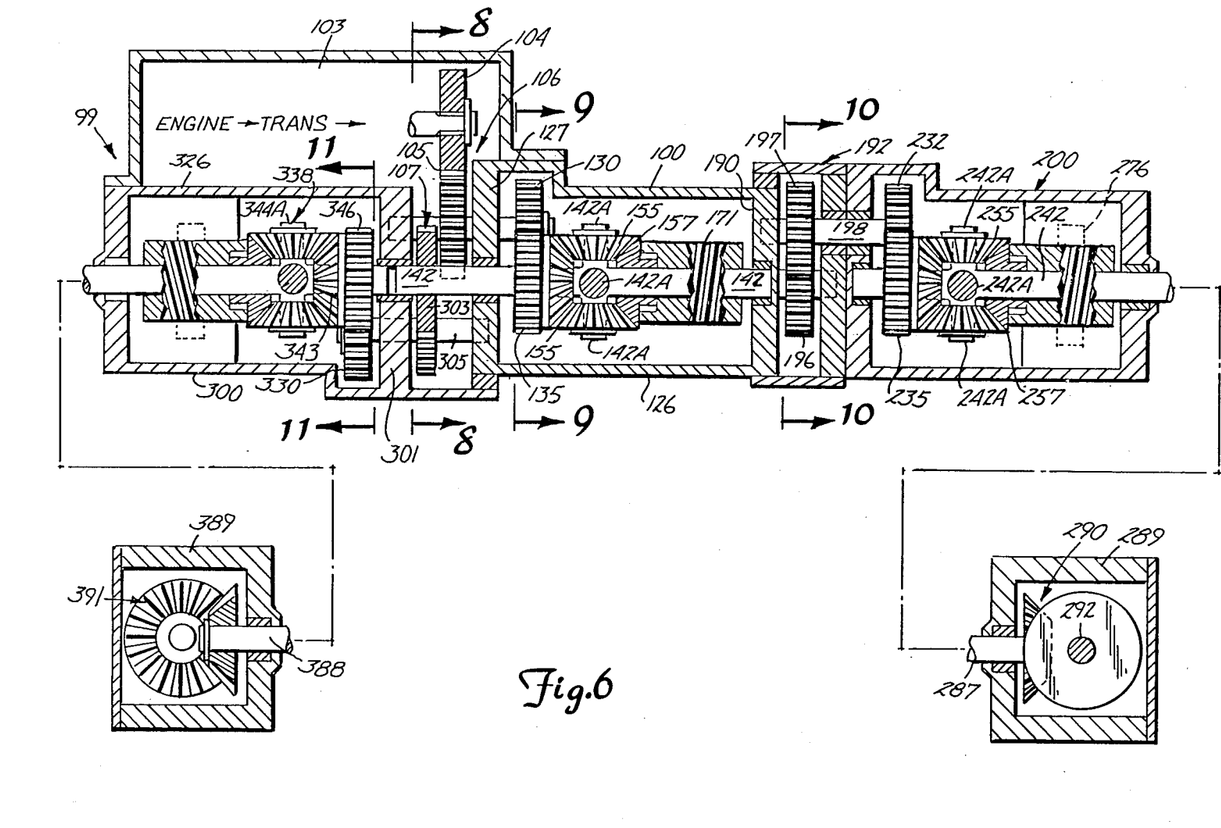
FIG. 6 is a side elevational view of a typical schematically shown four wheel drive arrangement using differential mechanisms made according to the present invention, with parts in section and parts broken away.
Figure 7:
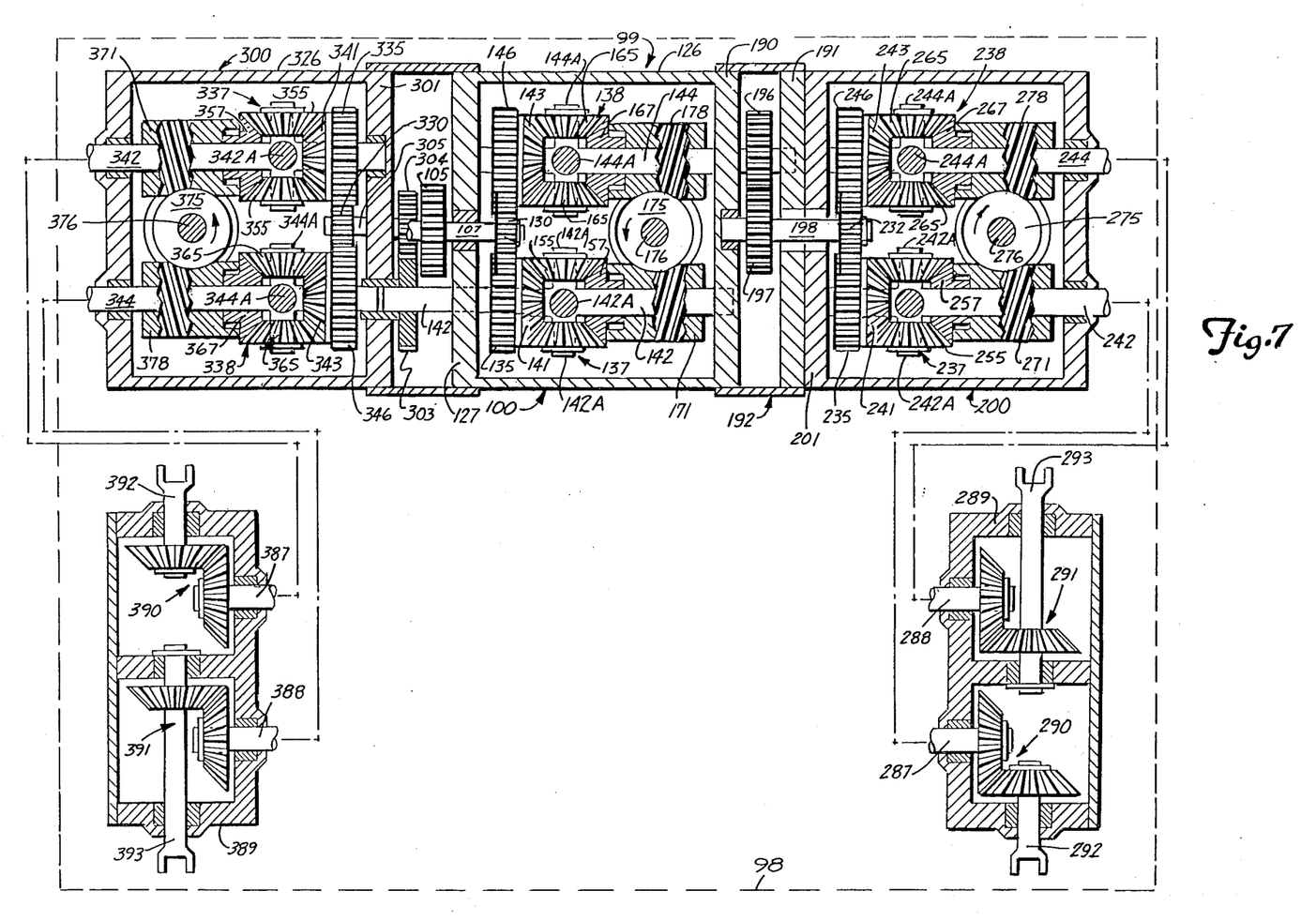
FIG. 7 is a top sectional view of the differential drive arrangement for a four wheel drive set up shown in FIG. 6 with parts in section and parts broken away.
Figure 9:
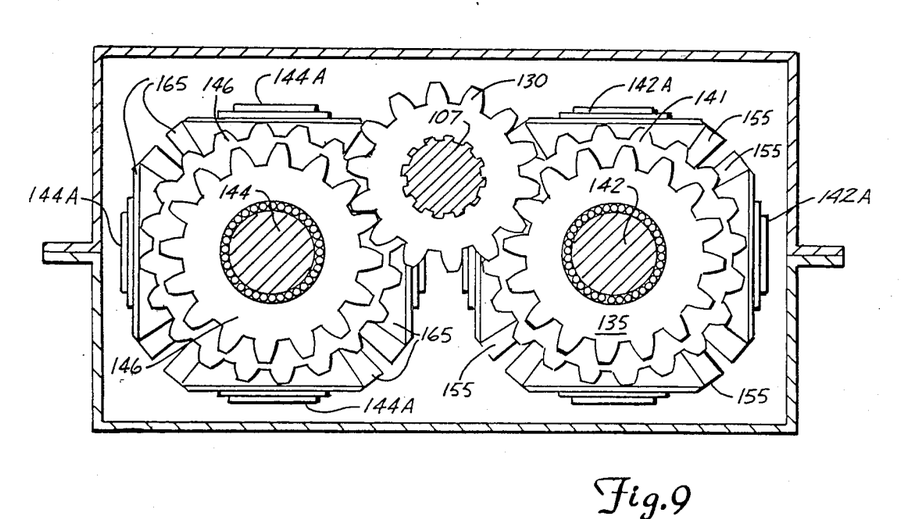
FIG. 9 is a sectional view taken along line 9—9 in FIG. 6.

As shown perhaps best in FIG. 6, the engine and transmission is indicated at 103, and this drives an output spur gear 104 that in turn drives a transfer gear 105 in a transfer gear case indicated generally at 106. The transfer gear in this instance, as can be seen in FIGS. 7 and 9 merely drives an input drive shaft 107 that drives in turn an input gear 130 corresponding to te input gear 30 in the first form of the invention, except that it is on the top side of the parallel, divided power paths. The gear clusters operate in the same manner, as described before, in this form of the invention. The spur gear 130 drives a pair of spur gears 135 and 146, respectively, corresponding to the gears 35 and 46, and the gear 135 drives an input bevel gear 141 for a first gear cluster 137 that has a plurality of orbit bevel gears 155 that are mounted onto a drive shaft 142, which has cross shafts 142A as previously explained and on which the bevel gears 155 are rotatably mounted.

This power path having shaft 142 has a control bevel gear 157 splined to a worm 171 which is rotatably mounted on the shaft 142, and which engages a worm gear 175 as in the previous form of the invention. The worm gear 175 is mounted on a shaft 176 that is in turn fixed onto the differential case 126.

The spur gear 146, driven by gear 130, drives a cluster gear assembly or set 138 that includes the input bevel gear 143 and a shaft assembly 144 having radial or cross shafts 144A on which spider bevel gears 165 are rotatably mounted. A control bevel gear 167 is used with gear cluster 138. Control bevel gear 167 in turn is splined or drivably connected to a worm 178 that also engages the worm gear 175 on an opposite side of gear 175 from worm 171. However, the lead angle of the worms 171 and 178 is left hand as opposed to right hand lead in the previous form of the invention for the purpose of directing worm end thrust against the case in forward drive. Gears 165 drivably engage gears 143 and 167.

In this form of the invention the drive shafts 142 and 144 drive toward opposite ends of the mid-differential 100, and as shown, the output shaft 144, used for driving the rear differential 200, is rotatably mounted in a rear wall 190 of the mid-differential 100, and is also rotatably mounted in a wall 191 forming a portion of a gear case indicated at 192 that is positioned between the mid-differential 100 and the rear differential 200.

Figure 10:
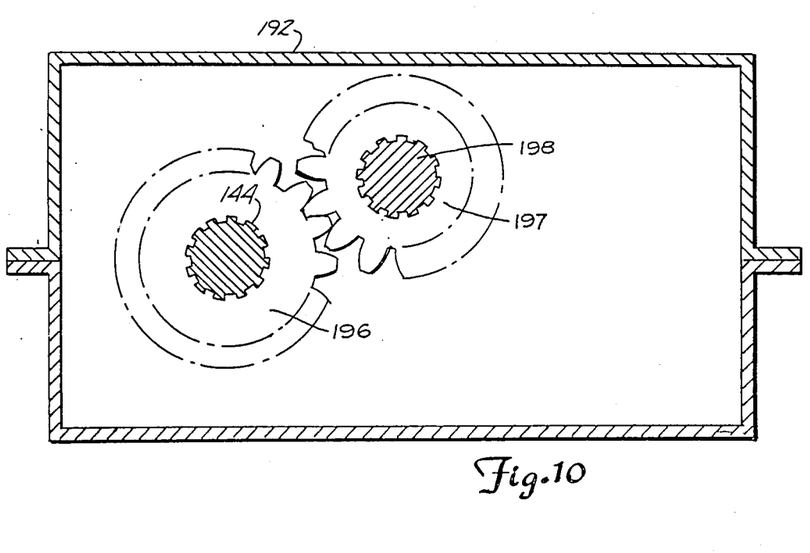
FIG. 10 is a sectional view taken along line 10—10 in FIG. 6.
Figure 11:
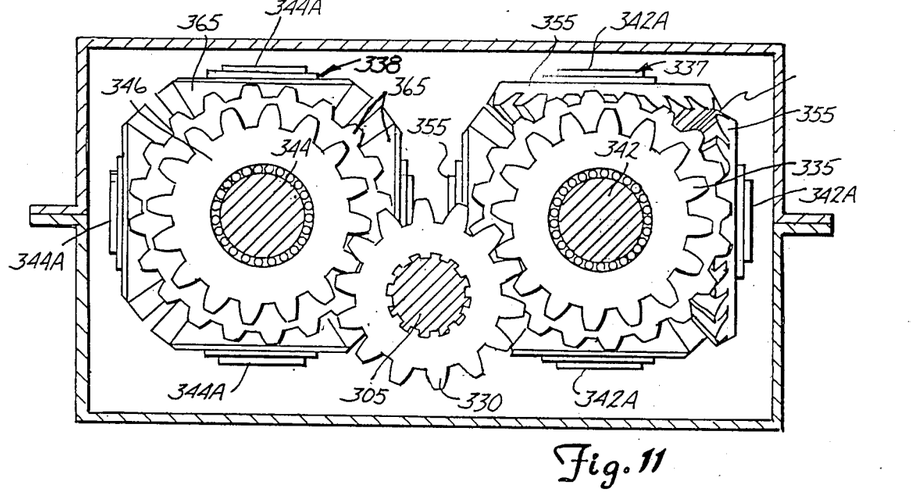
FIG. 11 is a sectional view taken along line 11—11 in FIG. 6.

As shown in FIGS. 6, 7 and 10, the shaft 144 drives a spur gear 196 mounted on splines on the shaft 144. The spur gear 196 in turn drives a spur gear 197. Spur gear 197 is drivably mounted onto a jack shaft or transfer shaft 198. The shaft 198 is drivably mounted in a front wall 201 of the rear differential 200, and in turn drives a spur gear 232. The spur gear 232 is aligned on the shaft 198, and thus will come in above the spur gears 235 and 246, which correspond to the previous gears 35 and 46.

The spur gear 235 drives differentiating bevel gear cluster 237, which is a differential drive controlled by a control gear 257, and operating with an output shaft 242. The shaft 242 has stub cross shafts 242A on which orbiting spider bevel gears 255 are rotatably mounted. The orbit bevel gears 255 are driven by the bevel gear 241 and the differential drive is controlled by the control bevel gear 257.

The control bevel gear 257 is drivably coupled through a suitable spline arrangement to a worm 271 that in turn is rotatably mounted on the output shaft 242. Worm 271 engages a worm gear 275 that is rotatably mounted onto a shaft 276 corresponding to the worm gear 75 and shaft 76 shown in FIGS. 1, 2 and 4.

The shaft 242 forms one of the parallel output power paths, for the rear differential 200. The rotation of shaft 242 is controlled by the gear cluster 237 and the control gear 257, which in turn is controlled by the relative rotation or holding action of the worm 27a and worm 275.

The spur gear 246 as shown drives a differentiating bevel cluster gear assembly 238 that forms a differential drive to an output shaft 244 that has a stub radial or cross shafts 244A thereon. The spur gear 246 also is drivably connected to an input drive bevel gear 243, which drives orbit idler bevel gears 265 mounted on the cross shafts 244A, which in turn are controlled by a control bevel gear 267 rotatably mounted on the output shaft 244. The control bevel gear 267 is drivably coupled to a worm 278.

The drive in this power path is from the bevel gear 243, through the orbit bevel gears 265, which engage the control gear 267 and orbit around the control gear. As the gears 265 orbit, they drive the shaft 244 through cross shafts 244A. The worm 278 which is drivably coupled to gear 267 also drivably engages the worm gear 275, and thus in non-differential drive will hold the control bevel gear 267 stationary and prevent it from rotating. When differentiation of movement between the shafts 242 and 244 is required, the control bevel gears 257 and 267 will both rotate but in opposite directions to permit differential rotation of output shafts 242 and 244.

The shaft 242 drives through suitable constant velocity or universal joints to an output shaft 287 leading to an output drive bevel gear set 290, which as can be seen provides for proper rotational direction of an output axle 292, in a conventional manner. The gear housing 289 supports the bevel gear set in a suitable way.

The drive shaft 244 drives a shaft 288 through a suitable constant velocity joint or universal joint, to in turn drive a bevel gear set 291 in gear housing 289. The bevel gear set 291 drives an axle 293 to drive the right rear wheel of the vehicle.

The positioning of the bevel gears on the axles 292 and 293 is selected to obtain and correct direction of rotation. These axles 292 and 293 are then connected through suitable universal joints to independently supported axles for the rear wheels.

The second output shaft 142 of the mid-differential 100 is rotatably mounted in the rear wall 190 of the differential housing 126 and extends forwardly through a forward wall 127 of the differential case 126. That is, shaft 142 extends forwardly through and beyond the spur gear 135. The gear 135 is rotatably mounted on the shaft 142 on suitable needle bearings or the like. The shaft 142 also is rotatably mounted in the wall 127 and extends into the gear case holding spur gear 105, as shown in FIGS. 6 and 7. This forwardly extending end of shaft 142, which corresponds to the second power path from the mid-differential 100 is ended and supported in a rear wall 301 of the differential case for the forward or front differential.

Figure 8:
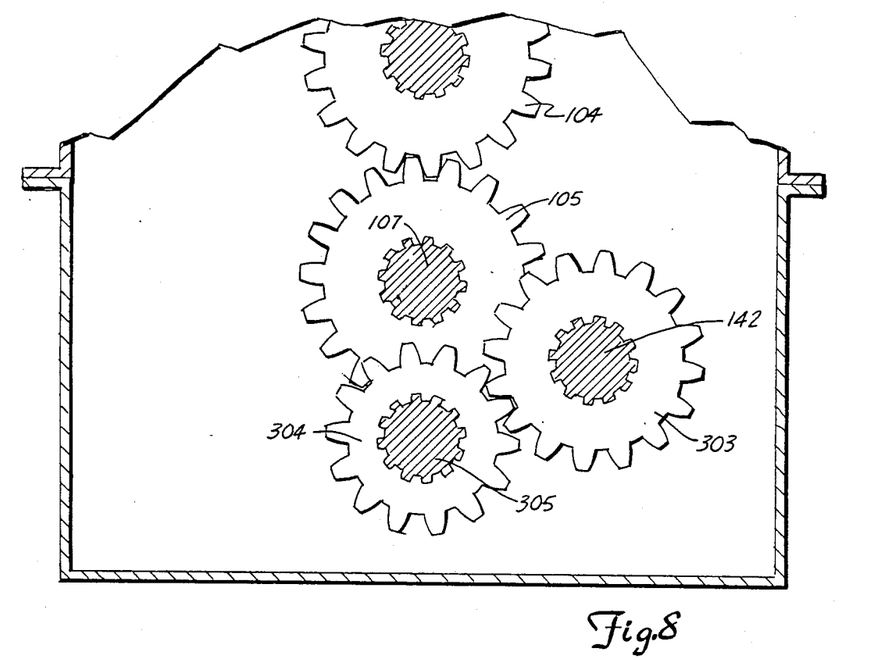
FIG. 8 is a sectional view taken along line 8—8 in FIG. 6.

A spur drive gear 303 is drivably mounted on the shaft 142, and it in turn drives another spur gear 304, which as shown in FIGS. 7 and 8 drives a shaft 305. The shaft 305 is rotatably mounted in the wall 301, and extends rearwardly and is also rotatably mounted in the forward wall 127 of the differential case 126 for the mid-differential.

The front differential 300 also includes the features of the present invention, and the drive shaft 305 drives a spur gear 330 that is mounted in the case 326 of the front differential 300. The spur gear 330 in turn drives gears 335 and 346, which are splined to drive bevel gears 341 and 343, respectively. The bevel gear 341 is part of a differentiating gear cluster assembly 337, which has a central shaft 342 that is one of the power paths for dividing power from the input shaft 305. The shaft 342 has a spider of radial or cross shafts 342A fixed thereto, on which orbit spider bevel gears 355 are rotatably mounted as previously explained. A control bevel gear 357 is rotatably mounted on the shaft 342 and engages the bevel gears 355. The gear 341 drives gears 355 as it is driven by the spur gear 335, which in turn causes the shaft 342 to rotate, since the control bevel gear 357 is being held or controlled. In the front differential the control bevel gear 357 is connected to a right hand worm 371 for the purposes of directing worm end thrust against the differential case in forward drive. The left-hand worms and worm gears are used in the mid and rear differentials for the same purpose, that is, for directing end thrust against a wall of the respective case in forward drive. The control bevel gear 357 and worm 371 are both rotatably mounted on shaft 342. The worm 371 in turn drivably engages a worm gear 375 rotatably mounted onto a shaft 376 that is held in the case 326, as previously explained.

The spur gear 346 drives the bevel gear 343 of a cluster gear set 338, that has an output shaft 344. The shaft 344 has a spider of radial or cross stub shafts 344A fixed thereto as previously shown, and each of the stub shafts 344A has an orbit spider bevel gear 365 rotatably mounted thereon. The bevel gears 365 are driven by the input bevel gear 343 and engage a control bevel gear 367 that is drivably engaged with a worm 378. The control bevel gear and worm 378 are rotatably mounted on the outwardly extending drive portion of shaft 344. The worm 378 drivably engages the worm gear 375 on an opposite side of the worm gear from worm 371.

The front differential 300 operates in the same manner as described, in that the input shaft 305 provides input power, and the differential has two power paths coupled by a differentiating control worm and worm gear assembly coupling the power paths and operating through differentiating gear clusters to drive the ouptut shafts 342 and 344.

As shown in FIGS. 6 and 7, a front axle drive housing 389 is provided, and it mounts a first shaft 387, and a second shaft 388, which are coupled through suitable constant velocity joints or universal joints to the shafts 342 and 344, respectively. The shaft 387 drives a bevel gear set 390, and the shaft 388 drives a bevel gear set 391 in the axle drive housing. The bevel gear set 390 drives an output axle 392, and the bevel gear set 391 drives an output axle 393 which are used for driving the wheels through suitable universal joints or constant velocity joints. The wheels in this form are the front wheels of an auotmobile which steer and which are power driven.

Operating on the same principle as before, that a worm can drive a worm gear, but the worm gear cannot drive the worm, the mid-differential will proportion torque between the front and rear differentials, and permit differential movement between the shafts 142 and 144 because the worms 171 and 178 when rotating in opposite directions permits rotation of the worm gear 175. This action provides different rotational speed of their control gears 157 and 167, respectively, which in turn provides through the differences in rotational speeds of the spider gears for different rotational speeds of the shafts 142 and 144.

In the 4-wheel drive version the mid-differential thus accommodates the need for a higher rpm power input to the front differential than the rear differential (since the front wheels, as a pair, drive in a turn with a larger turning radius than the rear wheels, as a pair), while at the same time proportioning torque to the end with greater combined wheel traction. The front and rear differentials also separately further proportion torque to the wheel of its pair with greater traction.

The front and rear differentials operate as previously explained to permit differentiation between the opposite axle shafts 292 and 293, respectively and 392 and 393, respectively.

By way of explanation, in a left turn, the differentiation will be such that the gear set 291 would have to rotate faster than the gear set 290, and the gear set 390 would have to rotate faster than the gear set 391. In this instance, shaft 244 will rotate faster than shaft 242 and this will cause the worm 278 to tend to turn as shown by the arrow in FIG. 7 on worm gear 275. The shfat 242 will be turning more slowly, which will permit the control gear 257 to rotate in opposite direction from control gear 267. In the mid-differential, the shaft 144 will turn more slowly than the shaft 142, causing the worm gear 175 to rotate as indicated by the arrow on worm gear 175 and permitting shaft 142 to rotate faster than shaft 144. Shaft 142 in turn is driving the front differential 300, and in this instance the shaft 342 must rotate faster than shaft 344, which causes the worm gear 375 to rotate in the direction as indicated by the arrow on the worm gear in FIG. 7. Differentiation occurs because the control gears for the respective cluster gear sets on the parallel power paths can rotate in opposite direction to permit differential speeds of the two shafts.

The torque that is applied to the control bevel gears of the respective differentiating gear cluster sets, and which is applied to the worms, cannot rotate the worm gear, unless differentiated drive causes them to rotate in opposite directions as previously explained. Further, if poor traction is encountered by one wheel the torque thrust from the worm on the good traction side acting to tend to rotate the worm gear cannot do so because the worm gear cannot rotate the worm on the poor traction side. Therefore, the power shaft on the poor traction side cannot increase in rpm but continues to rotate at the same rpm as the power shaft on the good traction side. Relative difference in rotation speeds of the two power shafts is possible and permitted only during and for the purpose of differentiated drive.

It should be noted that thrust bearings are used at the ends of the worm, and to back the gear clusters against the respective end walls of the differential gear cases and also between the control bevel gears and the respective cross arms to absorb and thrust, rather than having such thrust taken up by gear tooth engagement. Such details are well within the skill of persons working in the field. The gear cases are shown as having heavier end walls to absorb this trhust. Suitable bearings of course are used for the orbiting bevel gears, and these normally would be needle bearings used in the gear clusters, and also to rotatably mount the worm onto the respective parallel shafts that provide the divided power output. By using the same number of gear teeth on the spur gears that comprise the input gears to the gear clusters, equal power shaft drive ratios are achieved.

Figure 12:
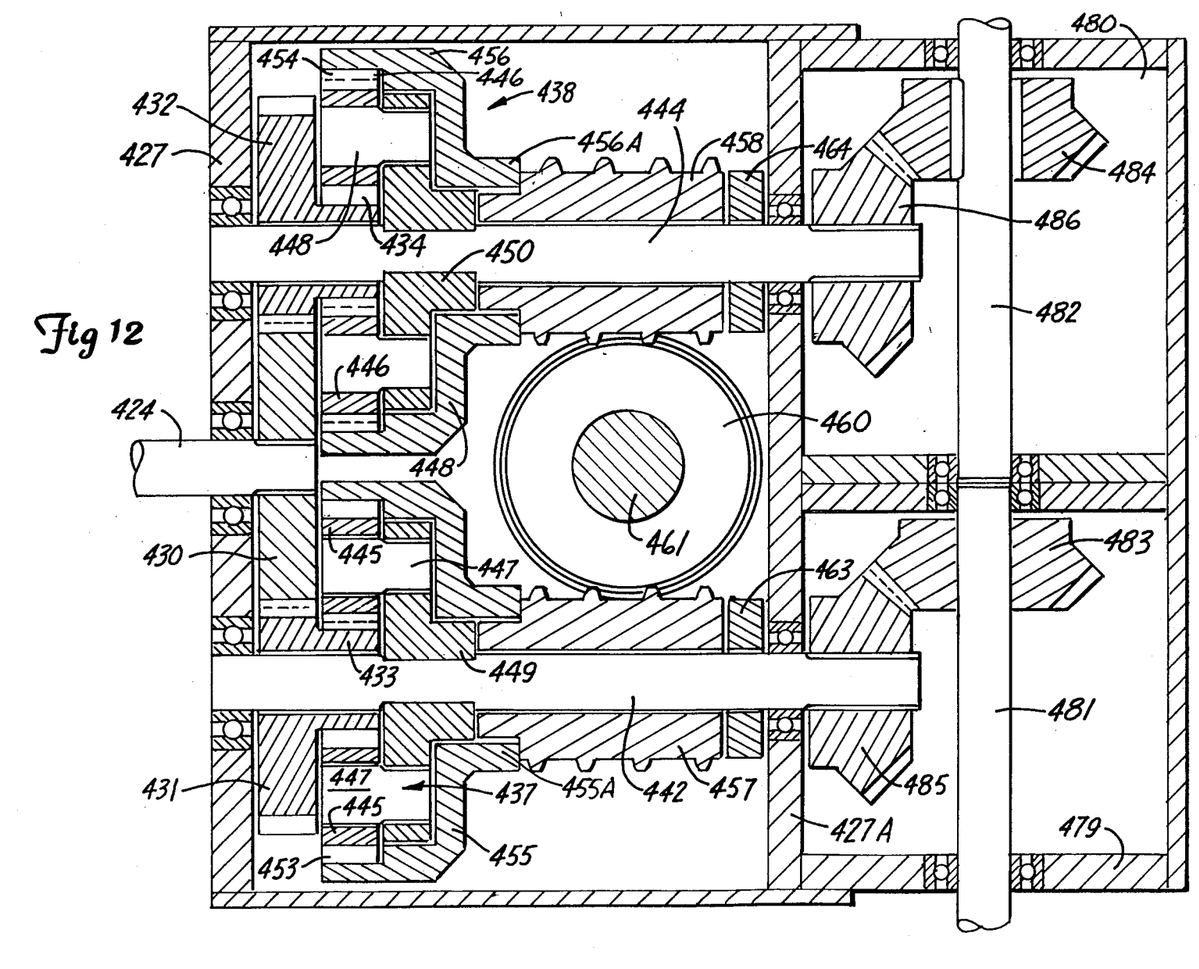
FIG. 12 is a modified form of the invention illustrated in the use of planetary gear arrangements having torque retaining and proportioning features for the differential drive assembly in accordance with the present invention.
Figure 13:
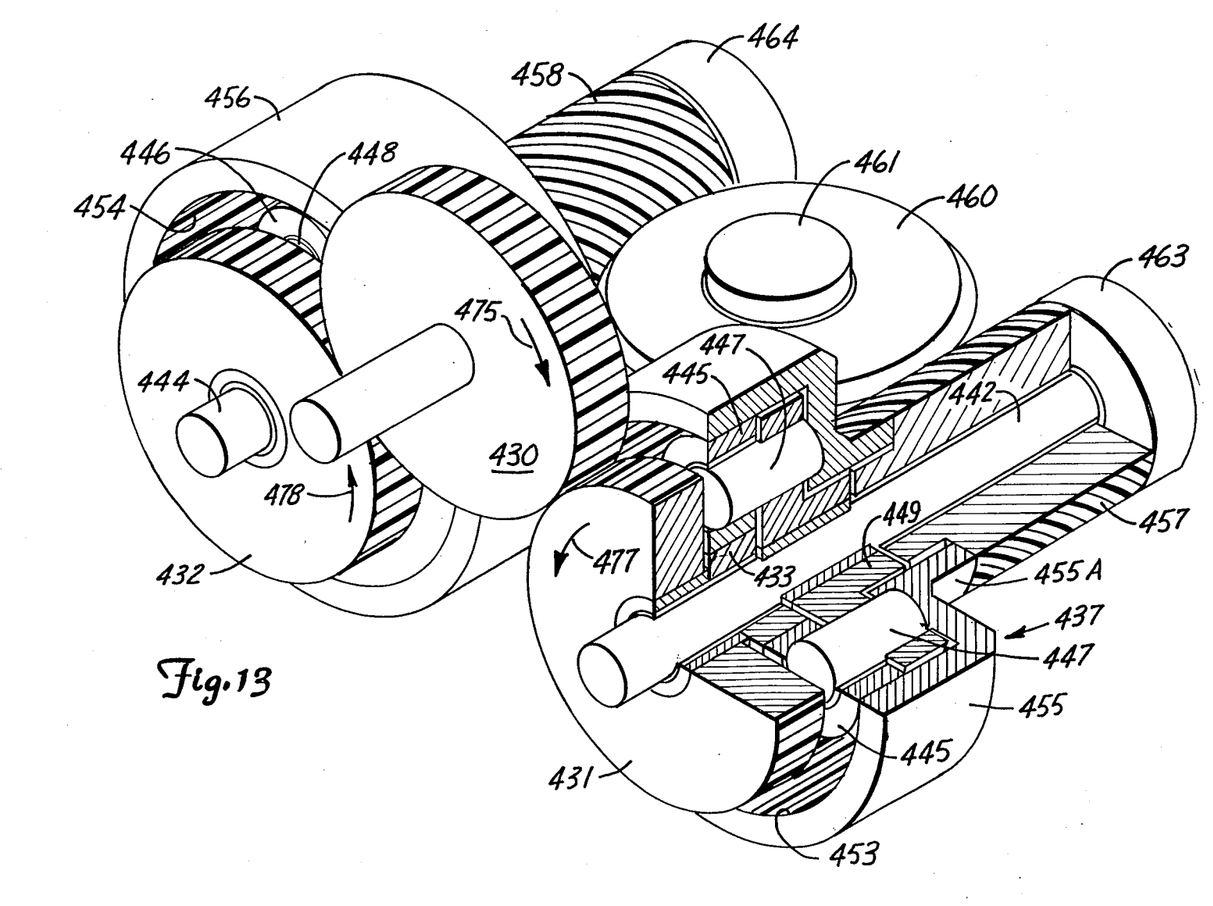
FIG. 13 is a perspective view of the device of FIG. 12.

Referring to FIGS. 12 and 13, a modified differential drive gear cluster assembly usable with the torque retaining and proportioning arrangement of the present invention is shown. FIG. 12 is a top view similar to FIG. 2 showing an outer case 427 that comprises a differential case, that can either be a mid-differential, front differential or rear differential as desired. An input shaft 424 is driven in the same manner as the shaft 24 previously explained and the input shaft is rotatably mounted on one end wall of the case. The shaft 424 drives a spur input gear 430 which in turn engages and drives a pair of power dividing spur gears 431 and 432, respectively, that form power input gears to differential gear clusters in this form comprising planetary gear sets 437 and 438. The power dividing gears are each coupled to drive planetary input sun gears 433 and 434, respectively, of the planetary gear sets 437 and 438.

The planetary gear sets 437 and 438 control the drive ratio between the input shaft 424 and a pair of parallel output shafts 442 and 444, respectively. The sun gears 433 and 434 drive planet gears 445 and 446, respectively, which are part of the gear sets 437 and 438, and the planet gears are in turn rotatably mounted on planet shafts 447 and 448, that are drivably mounted on planet shaft carriers or spiders 449 and 450. The planet carrier 449 and 450 are in turn drivably mounted onto the output shafts 442 and 444, respectively, and support the planet shafts at equally spaced location around the axis of the output shafts. The planet gears 445 and 446 also drivably engage internal gear teeth indicated at 453 and 454, respectively, that are on the interior of control gear assemblies 455 and 456. The control gears 455 and 456, while also forming a housing, have the internal teeth 453 and 454, respectively.

The gears 455 and 456 are rotatably mounted with respect to the planet shaft carriers 449 and 450, and thus with respect to the output shafts. The control gears 455 and 456 have gear hub portions 455A and 456A which are supported on and driven by a pair of torque retaining and differential control worms 457 and 458, respectively. The worms 457 and 458 are in turn rotatably mounted on the output shafts 442 and 444, respectively, or the rotation of the worms 457 and 458 are controlled through the use of a worm gear 460 that is rotatably mounted on a worm gear shaft 461 that is suitable mounted in a case 427, as previously shown in respect to the previous forms of the invention. Suitable thrust bearings 463 and 464, respectively, can be used for reacting thrust and for properly spacing the worms 457 and 458 with respect to the rear wall 427A of the case 427.

The rear wall 427A divides the differential from output or final drive housings 479 and 480, respectively. An output axle 481 is supported in housing 479, and an output axle 482, which extends in opposite directions from axle 481, is mounted in the housing section 480. The axle 481 is driven from a bevel gear 483, which in turn engages a bevel gear 485 that is drivably mounted on the output shaft 442. The output axle 482 has a bevel gear 484 drivably mounted thereon, which in turn is driven by a bevel gear 486 that is drivably mounted on the output shaft 444.

Referring to FIG. 13, it can be seen that drive from the input gear 430, for example, in direction shown by the arrow 475, will cause the power dividing spur gears 431 and 432 to rotate in direction as indicated by the arrows 477 and 478. This in turn will drive the sun gears 433 and 434 in the same direction as the spur gears 431 and 432, which will cause the planet gears 445 and 446 to be driven. The spur gear 431 ad its spun gear 433, and the spur gear 432 and its sun gear 434 are rotatably mounted on the output shafts 442 and 444, respectively. The shafts 442 and 444 are in turn suitably rotatably supported on the case 427.

If the worms 457 and 458 are being held by worm gear 460, this will in turn prevent the control gears 455 and 456 from rotating (they are coupled to the worms) and will cause the planet gears to drive the sets of planet shafts 447 and 448 in an orbital path around the respective output shafts 442 and 444. This will in turn drive the output shafts in that the planet carriers are splined to these shafts. The drive ratio between the respective sun gear and internal ring gear will determine the relative output speed. Output shafts 442 and 444 are driven through the planet gears and the planet shaft carriers 449 and 450 with the internal ring gear (control gear) held. The drive ratio can be one-to-one so that for each revolution of the input shaft 424, the output shafts are also rotating at the same number of rpm with the control gears both 455 and 456 held from rotation.

Therefore, for example, with a spur gear of 1.5 inches in pitch diameter and a ring gear housing having a pitch diameter of 3.5 inches, the ratio of input rpm to that of the output shafts is 3:1.

The worm gear 460 will control the relative rotation between the worms 457 and 458, as previously explained, which also controls the rotation of the control gears 455 and 457. If there is a need for a differential drive, one of the worms will rotate in one direction, and the other worm will rotate in the other direction while the worm gear 460 permits such rotation, and this will permit a differential in rotation between the two output shafts 442 and 444 under control of this worm-worm gear arrangement. Differential rotation between the control gears 455 and 456 will occur to change the relative rotation of the output shafts in the same manner as that which is used with the bevel gear sets. The bevel gear sets and the planetary gear sets shown herein both comprise differentiating gear sets controlled by the respective output control gears 57 and 67, for example, in FIG. 4 and 455 and 456 in FIG. 12.

Thus, the embodiment shown in FIGS. 12 and 13 use the same differential gear concept as controlled by the torque retaining and differential worm and worm gear arrangements, but using an alternate type of gearing for accomplishing this differential movement under such worm-worm gear control.

The differential assembly such as that shown in FIGS. 6 and 7 or in FIGS. 12 and 13 can be quite compact. Examples of the gear sizes for the bevel gear clusters would be an input bevel gear and control bevel gear of 20 teeth, and the orbiting bevel gears on the cross shaft arms would be 16 teeth. Worms for both forms of the invention preferably are quadruple thread having a helix angle of 20° for a pitch diameter of 1.833" engaging a worm gear providing 4.5" between parallel power shaft centers. The output axle bevel gear assemblies can be 20 tooth bevel gears, and with this type of gearing arrangement, and with the spur gears generally ranging between 14 and 16 teeth for the input gears, the total length for a four wheel drive mid-mounted differential assembly such as that shown in FIGS. 6 and 7 would be in the range of 28 to 30 inches, with a width of about 9¼ inches, and a height of about five inches. Thus, it is very compact and, designed to be built with adequate bearings throughout will transmit most efficiently the available torque to the wheel in 2-wheel drive and to the end and wheel(s) in 4-wheel drive where it can be used most effectively.

In the form of the invention shown in FIGS. 12 and 13, the input spur gears and power dividing spur gears can be in the range of 30 teeth with the sun and planet gears being 12 teeth. The control gear teeth are selected in number to mesh with the planet gears.

Final drive ratios in a wide range from about 2.75:1 to 4.75:1 can, or course, be obtained by varying transmission input and/or transfer gears and/or the pairs of power shaft bevel drive and axle bevel side gears, or by varying the size of the planetary gears in the planetary form of the invention.

Although the present invention has been described with reference to preferred embodiments, workers skilled in the art will recognize that changes may be made in form and detail without departing from the spirit and scope of the invention.

While deviation from the wording of descriptions and the presentation and proportions shown in the initial informal drawings will occur as the invention is designed for specific applications, the drawings and descriptions herein are held to encompass the same and to be by way of explanation rather than limitation. Obviously, innumerable departures are possible, such as: dimensions of axles and drive shafts, shaft center distance, diametral pitch and pitch diameter of gears, helix angle of worms and worm gears, design of the outer case and assembly features; spacing, shimming, and friction reducing components; and type and number of bearings, materials, and lubrication mediums and methods. For instance, such specifics as the use of different worm and worm gear helix angles for the differentiated arrangement, with intention of enhancing differentiation under some circumstances while not interfering with retainment of torque, is an engineering design decision encompassed in the claimed inventive concepts depicted and described.

What is claimed is:

1. A torque proportioning differential drive housed in a gear case and having a common power input the differential drive comprising a pair of substantially identical gear sets, each of said gear sets being driven from said common power input and each gear set having a separate output drive shaft that is loaded under differing loads from time to time resulting from a need for differential speed from the output shaft of the other gear set, each gear set comprising first differentiating gear means including a drive gear connected to receive power from the input, second gear means coupled to the drive gear and coupled to rotate with the respective output shaft, and a rotatable control member controlling rotation of the second gear means, the rotation of which control member controls the ratio of speeds of the associated output shaft relative to the drive gear;

means for controlling rotation of both of said control members of the pair of gear sets comprising a pair of worms, one coupled to each of said control members, and a worm gear common to and engaged by both of said worms whereby each of the worms will rotate only when the other worm rotates in an opposite direction; and said output shafts of the respective gear sets being parallel with each other and extending outwardly of said case, said worms and worm gear cooperating to permit rotation of the respective control members as a function of the load carried by the ouptut shafts, respectively when there is a necessity for differential rotational speeds of the output shafts.

2. The apparatus as specified in claim 1 wherein said worms are each rotatably mounted on one of the output drive shafts, respectively.

3. The apparatus as specified in claim 1 wherein said first gear means of each gear set comprises a separate bevel gear arrangement, each drivably coupled on an output shaft, each drive gear comprising a drive bevel gear and each bevel gear arrangement comprising a plurality of spider gears rotatably mounted on radially extending cross shafts fixed to the respective output drive shaft, and the control member comprising a control bevel gear, said spider gears of each gear set drivably engaging both the input bevel gear and the control bevel gear of the respective gear set.

4. The apparatus as specified in claim 2 wherein said output drive shafts each extend in an opposite direction from said gear case.

5. The apparatus as specified in claim 1 and separate axle drive means coupled to each of said output drive shafts, said axle driving means each being adapted to provide a drive to a separate drive axle extending outwardly on opposite sides of the axle drive means, and each drive axle being driven by one of said output drive shafts.

6. The apparatus as specified in claim 2 wherein said worm gear is mounted onto a shaft having an axis perpendicular to the axes of said output shafts, and positioned midway between the output shafts.

7. The apparatus as specified in claim 6 wherein said worms have a lead angle each in the same direction.

8. The apparatus as specified in claim 4 wherein the differential drive in a mid differential, separate second and third differential means drivably coupled to the output shafts of the mid-differential for providing front and rear wheel drive means, respectively, and wherein each of said output shafts drives one of the separate second and third differential means.

9. The apparatus as specified in claim 1 wherein said worm gear is rotatably mounted on a shaft having an axis perpendicular to the axes of said output shafts and engages both of said worms, and an axle drive comprising two bevel gear sets, each having a laterally extending axle extending in opposite directions from said axle drive, the bevel gear sets each including an input shaft coupled to one of said output shafts for rotation therewith.

10. The apparatus as specified in claim 1 and input spur gear means comprising the power input to said drive differential.

11. The apparatus of claim 1 wherein the gear sets comprise bevel gear sets, including input bevel gears and spider gears mounted on radial cross shafts fixed to the respective output shaft.

12. The apparatus of claim 1 wherein each gear set comprises a planetary gear set, having an input sun gear and planetary gears coupled to the respective output shaft.

13. For use in combination with a vehicle having a four wheel drive arrangement having means providing input power;

first differential means receiving said input power and providing first and second output shafts, one extending in an aft direction and the other extending in a forward direction, the first differential means proportioning torque and permitting differential rotational speeds between said output shafts;

a rear differential drive and a front differential drive, each having a separate case, and each being driven at an input end thereof by one of the output shafts of said first mentioned differential means;

each of said front and rear differential drives including a pair of gear clusters providing for differential rotational movement between an input gear and a pair of output shafts having axes of rotation which are spaced apart control gear means for controlling the amount of differentiation provided in each of said gear clusters between the input gear and the respective output shafts; and a pair of worms, one drivably coupled to each of said control gears and each worm being rotatably mounted on a respective output shaft, and a worm gear mounted between said worms and permitting rotation of said worms and the associated control gear only when one worm rotates in an opposite direction from the other worm.

14. The apparatus of claim 13 wherein said front and rear differential drives each drive a pair of axles extending laterally therefrom, and wherein said first differential permits independent differential movement between the front and rear differentials.

15. The apparatus as specified in claim 14 wherein said input power means drives through a spur gear drive arrangement.

16. A torque proportioning differential drive housed in a gear case and having a common power input and comprising a pair of substantially identical gear sets, each of said gear sets being driven from said common power input, and each gear set comprising a differentiating planetary gear set including a sun gear connected to receive power from the input, planet gears driven by said sun gear and adapted to drivably engage a control gear coaxial with said sun gear;

the differential drive further including means for controlling rotation of said control gears of both gear sets comprisig a pair of worms, one worm drivably connected to and coaxial with each of said control gears, and a worm gear drivably coupled to both of said worms whereby each of the worms will rotate only when the other worm rotates in an opposite direction;

separate output drive shaft means, associated with each planetary gear set for carrying loads which change and which result from the need for differentiating in speed of rotation of said output drive shaft means;

means driven by said planet gears of each gear set and coupled to drive the separate output drive shaft means, said output drive shaft means being, respectively, coaxial with the respective sun gears and extending outwardly of said case, said worms and worm gear cooperating to prevent dissipation of torque and to permit rotation of the control gears as a function of the loads carried when there is a necessity for opposite differentiating rotation.

17. The apparatus of claim 16 wherein the means driven by the planet gears comprises a separate planet carrier drivably mounted on the respective output drive shaft means and each planet carrier having planet shafts thereon, said planet shafts supporting the planet gears.

18. The apparatus of claim 16 wherein the control gears comprise an internal gear tooth portion surrounding the respective planet gears and drivably engaging all of the planet gears in the respective gear set.

19. A torque proportioning differential drive comprising:

first and second parallel rotating output shafts journaled in bearings in a gear case and driven by a common rotating power input through a substantially identical differential drive gear set mounted on each output shaft;

a separate control worm rotatably mounted on each output shaft, differentiating rotational speed between the rotating power input and the respective output shafts of gear set being controlled by the control worm rotatably mounted on the respective output shaft;

a single worm gear rotatably mounted in the gear case perpendicular to and between said output shafts and being engaged by both worms, said differential drive gear sets each comprising a first drive element rotatably mounted on each output drive shaft and receiving power from the common power input, a second driven element coupled to its respective output drive shaft, and a third control element rotationally drivably coupled to the respective worm and rotatably mounted for movement with the worm on the respective output shaft;

said worms and engaged worm gear controlling the control element of each of said differential drive gear sets for controlling differential rotation of said parallel output drive shafts, the worm gear having a lead angle such that the worm gear cannot rotatably drive either worm and rotates only when the worms rotate in opposite direction to thereby proportion input torque to the output shafts.

* * * * *

UNITED STATES PATENT AND TRADEMARK OFFICE
CERTIFICATE OF CORRECTION

PATENT NO. : 4,762,022

DATED : August 9, 1988

INVENTOR(S) : Edward W. Johnshoy

It is certified that error appears in the above-identified patent and that said Letters Patent is hereby corrected as shown below:

Column 14, line 19, delete "load" and insert --loads--; line 20, delete "ouptut" and insert --output--; line 42, delete "driving" and insert --drive--; line 54, delete "in" and insert --is--.

Signed and Sealed this

Twentieth Day of December, 1988

*Attest:*

DONALD J. QUIGG

*Attesting Officer*     *Commissioner of Patents and Trademarks*